US009453606B2

(12) United States Patent
Catha et al.

(10) Patent No.: US 9,453,606 B2
(45) Date of Patent: *Sep. 27, 2016

(54) MOVABLE FACTORY FOR SIMULTANEOUS MOBILE FIELD MANUFACTURING AND INSTALLATION OF NON-METALLIC PIPE

(75) Inventors: Stephen Crockett Catha, Houston, TX (US); Ivan C. Mandich, Hetairie, LA (US); Aron Robert Ekelund, Katy, LA (US); Kenneth Ray Charboneau, Slidell, LA (US); Justin Michael Reed, Houston, TX (US); William D. Stringfellow, Houston, TX (US)

(73) Assignee: SMART PIPE COMPANY, INC., Houston, TX (US)

( * ) Notice: Subject to any disclaimer, the term of this patent is extended or adjusted under 35 U.S.C. 154(b) by 943 days.

This patent is subject to a terminal disclaimer.

(21) Appl. No.: 13/506,687

(22) Filed: May 8, 2012

(65) Prior Publication Data

US 2012/0285575 A1 Nov. 15, 2012

Related U.S. Application Data

(63) Continuation-in-part of application No. 12/455,582, filed on Jun. 3, 2009, now Pat. No. 8,567,450, and a continuation-in-part of application No. 12/317,376, filed on Dec. 22, 2008, now Pat. No. 8,567,448.

(51) Int. Cl.
*F16L 11/12* (2006.01)
*B29K 23/00* (2006.01)
(Continued)

(52) U.S. Cl.
CPC ......... *F16L 55/1656* (2013.01); *B29D 23/001* (2013.01); *F16L 1/038* (2013.01);
(Continued)

(58) Field of Classification Search
CPC ..... F16L 55/1656; F16L 1/038; F16L 11/12; B29D 23/001; B29C 63/105; B29C 66/71; B29C 66/5221; B29C 65/20; B29C 53/58; B29C 66/1142; Y10T 156/17; Y10T 29/53; Y10T 29/53048; Y10T 29/53052; Y10T 29/49828; B29K 2023/086; B29K 2023/065; B29K 2023/0675; B29K 2023/06; B29K 2023/083; B29K 2105/0079

USPC .......... 29/429, 700, 711, 712; 156/143, 173, 156/175, 195; 405/154.1, 155, 156, 158, 405/184, 184.1, 184.2

See application file for complete search history.

(56) References Cited

U.S. PATENT DOCUMENTS 1,722,764 A * 7/1929 Rasch ........................... 442/240
2,099,954 A * 11/1937 Cook ........................ 128/204.16
(Continued)

FOREIGN PATENT DOCUMENTS

EP 0 231 154 5/1987 ............. B29C 53/62

OTHER PUBLICATIONS

Composites World; http://www.compositesworld.com/articles/in-situ-manufacturing-pipe-relining-in-demanding-corrosive-environments; Jan. 1, 2007; pp. 34-38.*

(Continued)

*Primary Examiner* — David Bryant
*Assistant Examiner* — Bayan Salone
(74) *Attorney, Agent, or Firm* — Guy McClung

(57) ABSTRACT

Movable systems and methods for making pipe, e.g., non-metallic pipe, either for stand-alone use as produced or for use as a pipe liner, the pipe made at a site at which it is to be used; and, in certain aspects, a transportable factory for simultaneous mobile field manufacturing and installation for making pipe, e.g., reinforced thermoplastic composite pipe, either for stand-alone use or for use as a pipe liner, the pipe made, in one aspect, at a site of use of the pipe. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

19 Claims, 6 Drawing Sheets

(51) Int. Cl.
  *B29C 65/00*    (2006.01)
  *B29K 105/00*   (2006.01)
  *F16L 55/165*   (2006.01)
  *F16L 1/00*     (2006.01)
  *B29D 23/00*    (2006.01)
  *F16L 1/038*    (2006.01)
  *B29C 53/58*    (2006.01)
  *B29C 65/20*    (2006.01)
  *B29L 23/00*    (2006.01)
  *B29C 63/10*    (2006.01)

(52) U.S. Cl.
  CPC ............ *F16L 11/12* (2013.01); *B29C 53/58* (2013.01); *B29C 63/105* (2013.01); *B29C 65/20* (2013.01); *B29C 66/1142* (2013.01); *B29C 66/5221* (2013.01); *B29C 66/71* (2013.01); *B29K 2023/065* (2013.01); *B29K 2023/0675* (2013.01); *B29K 2023/0691* (2013.01); *B29K 2023/083* (2013.01); *B29K 2023/086* (2013.01); *B29K 2105/0079* (2013.01); *B29L 2023/006* (2013.01); *Y10T 29/49828* (2015.01); *Y10T 29/53* (2015.01); *Y10T 29/53048* (2015.01); *Y10T 29/53052* (2015.01); *Y10T 156/17* (2015.01)

(56) References Cited

U.S. PATENT DOCUMENTS

| | | | | |
|---|---|---|---|---|
| 2,424,315 A * | 7/1947 | Hyatt et al. | 138/128 |
| 2,502,638 A * | 4/1950 | Becht | 156/188 |
| 2,605,202 A * | 7/1952 | Reynolds | 29/429 |
| 2,949,867 A * | 8/1960 | Ramsey | 105/377.1 |
| 3,099,190 A * | 7/1963 | Allen, Jr. et al. | 493/299 |
| 3,177,902 A * | 4/1965 | Rubenstein | 138/176 |
| 3,224,203 A * | 12/1965 | Brannfors et al. | 405/150.2 |
| 3,253,618 A * | 5/1966 | Cook | 138/125 |
| 3,329,173 A * | 7/1967 | Post et al. | 138/125 |
| 3,396,441 A * | 8/1968 | Robinson | 425/182 |
| 3,399,686 A * | 9/1968 | Horton | 135/132 |
| 3,465,726 A * | 9/1969 | Gerst | 122/1 R |
| 3,500,869 A * | 3/1970 | Weierter et al. | 138/130 |
| 3,599,233 A * | 8/1971 | Meyer | 703/9 |
| 3,616,072 A * | 10/1971 | Bostrom | 156/468 |
| 3,769,127 A | 10/1973 | Goldsworthy et al. | 156/172 |
| 3,779,308 A * | 12/1973 | Buhrmann et al. | 165/51 |
| 3,799,825 A * | 3/1974 | Champleboux et al. | 156/144 |
| 3,823,590 A * | 7/1974 | Lang | 72/66 |
| 3,905,398 A * | 9/1975 | Johansen et al. | 138/124 |
| 4,000,759 A | 1/1977 | Higbee | 138/130 |
| 4,009,063 A * | 2/1977 | Wood | 156/71 |
| 4,029,428 A * | 6/1977 | Levens | 408/127 |
| 4,042,255 A | 8/1977 | Drewek et al. | 280/445 |
| 4,053,343 A | 10/1977 | Carter | 156/172 |
| 4,064,211 A | 12/1977 | Wood | 264/516 |
| 4,120,324 A * | 10/1978 | Pahl | 138/137 |
| 4,123,928 A * | 11/1978 | Ferrentino | 72/66 |
| 4,135,958 A * | 1/1979 | Wood | 156/199 |
| 4,142,352 A * | 3/1979 | Greczin | 57/15 |
| 4,183,724 A * | 1/1980 | Larive | 425/62 |
| 4,207,130 A * | 6/1980 | Barber | 156/244.13 |
| 4,344,357 A * | 8/1982 | Mittelkotter | 454/172 |
| 4,351,349 A * | 9/1982 | Minotti | 137/15.15 |
| 4,366,012 A * | 12/1982 | Wood | 156/93 |
| 4,384,595 A * | 5/1983 | Washkewicz et al. | 138/127 |
| 4,390,574 A * | 6/1983 | Wood | 428/34.1 |
| 4,438,944 A | 3/1984 | Della-Moretta | 280/460 R |
| 4,446,181 A * | 5/1984 | Wood | 428/36.1 |
| 4,459,883 A * | 7/1984 | Astle | 82/113 |
| 4,478,661 A * | 10/1984 | Lewis | 156/92 |
| 4,495,018 A * | 1/1985 | Vohrer | 156/187 |
| 4,558,971 A * | 12/1985 | David | 405/158 |
| 4,576,205 A * | 3/1986 | Morinaga et al. | 138/98 |
| 4,622,196 A * | 11/1986 | Wood | 264/229 |
| 4,631,813 A * | 12/1986 | Daniels et al. | 29/727 |
| 4,668,125 A | 5/1987 | Long, Jr. | 405/184.2 |
| 4,685,983 A | 8/1987 | Long, Jr. | 156/64 |
| 4,756,339 A * | 7/1988 | Buluschek | 138/115 |
| 4,776,370 A | 10/1988 | Long, Jr. | 138/98 |
| 4,777,984 A * | 10/1988 | Storah | 138/98 |
| 4,836,715 A | 6/1989 | Wood | 405/150.1 |
| 4,838,477 A | 6/1989 | Roach et al. | 228/222 |
| 4,851,274 A * | 7/1989 | D'Elia | 428/113 |
| 4,863,365 A | 9/1989 | Ledoux et al. | 425/343 |
| 4,976,290 A * | 12/1990 | Gelin et al. | 138/141 |
| 4,985,196 A * | 1/1991 | LeDoux et al. | 264/516 |
| 4,998,871 A | 3/1991 | Ledoux | 425/140 |
| 5,010,440 A * | 4/1991 | Endo | 361/215 |
| 5,035,539 A * | 7/1991 | Kawafuji et al. | 405/184.2 |
| 5,049,006 A * | 9/1991 | Payne | 405/270 |
| 5,072,622 A * | 12/1991 | Roach et al. | 73/40.5 R |
| 5,077,107 A * | 12/1991 | Kaneda et al. | 428/36.1 |
| 5,094,044 A * | 3/1992 | Dykmans | 52/80.1 |
| 5,152,323 A * | 10/1992 | Shotts et al. | 138/151 |
| 5,156,195 A * | 10/1992 | Wehler et al. | 160/202 |
| 5,186,987 A * | 2/1993 | Imoto et al. | 428/34.5 |
| 5,225,021 A * | 7/1993 | Lona | 156/190 |
| 5,271,433 A * | 12/1993 | Schwert et al. | 138/98 |
| 5,295,703 A | 3/1994 | White | 280/414.1 |
| 5,374,174 A | 12/1994 | Long, Jr. | 425/11 |
| 5,395,472 A * | 3/1995 | Mandich | 156/287 |
| 5,397,513 A * | 3/1995 | Steketee, Jr. | 264/36.17 |
| 5,399,854 A * | 3/1995 | Dunphy et al. | 250/227.17 |
| 5,408,793 A * | 4/1995 | Dykmans | 52/81.6 |
| 5,497,809 A * | 3/1996 | Wolf | 138/113 |
| 5,501,248 A * | 3/1996 | Kiest, Jr. | 138/98 |
| 5,503,695 A * | 4/1996 | Imoto et al. | 156/71 |
| 5,546,992 A * | 8/1996 | Chick et al. | 138/98 |
| 5,551,484 A * | 9/1996 | Charboneau | 138/104 |
| 5,632,952 A * | 5/1997 | Mandich | 264/516 |
| 5,634,743 A * | 6/1997 | Chandler | 405/150.1 |
| 5,680,885 A * | 10/1997 | Catallo | 138/98 |
| 5,712,010 A * | 1/1998 | Russek et al. | 428/36.3 |
| 5,755,266 A | 5/1998 | Aanonsen | 138/174 |
| 5,762,450 A * | 6/1998 | Schmager | 405/184.2 |
| 5,778,938 A * | 7/1998 | Chick et al. | 138/98 |
| 5,828,003 A | 10/1998 | Thomeer | 174/69 |
| 5,865,216 A * | 2/1999 | Youngs | 138/135 |
| 5,868,169 A * | 2/1999 | Catallo | 138/98 |
| 5,921,285 A * | 7/1999 | Quigley et al. | 138/125 |
| 5,925,080 A | 7/1999 | Shinbara et al. | 701/23 |
| 5,931,199 A * | 8/1999 | Kittson et al. | 138/98 |
| 5,933,945 A * | 8/1999 | Thomeer et al. | 29/825 |
| 5,934,332 A * | 8/1999 | Rodriguez et al. | 138/98 |
| 6,000,261 A * | 12/1999 | Johnston | 72/49 |
| 6,004,639 A * | 12/1999 | Quigley et al. | 428/36.3 |
| 6,058,978 A * | 5/2000 | Paletta et al. | 138/98 |
| 6,065,540 A | 5/2000 | Thomeer et al. | 166/297 |
| 6,098,665 A * | 8/2000 | Grace | 138/98 |
| 6,117,507 A * | 9/2000 | Smith | 428/36.9 |
| 6,123,110 A * | 9/2000 | Smith et al. | 138/98 |
| 6,148,866 A | 11/2000 | Quigley et al. | 138/125 |
| 6,165,303 A * | 12/2000 | Darby et al. | 156/175 |
| 6,170,531 B1 * | 1/2001 | Jung et al. | 138/98 |
| 6,199,591 B1 * | 3/2001 | Kiest et al. | 138/98 |
| 6,220,079 B1 * | 4/2001 | Taylor et al. | 73/37 |
| 6,286,557 B1 | 9/2001 | May | 138/110 |
| 6,286,558 B1 | 9/2001 | Quigley et al. | 138/110 |
| 6,299,803 B1 | 10/2001 | Ledoux | 264/35 |
| 6,302,152 B1 * | 10/2001 | Mulligan | 138/125 |
| 6,305,423 B1 | 10/2001 | Demeyer et al. | 138/33 |
| 6,311,730 B2 * | 11/2001 | Penza | 138/98 |
| 6,357,485 B2 * | 3/2002 | Quigley et al. | 138/125 |
| 6,361,299 B1 * | 3/2002 | Quigley et al. | 428/35.9 |
| 6,438,456 B1 | 8/2002 | Feddema et al. | 700/245 |
| 6,445,984 B1 | 9/2002 | Kellogg | 701/23 |
| 6,446,672 B1 * | 9/2002 | Kalman et al. | 138/127 |
| 6,450,524 B1 | 9/2002 | Lippens et al. | 280/445 |
| 6,455,115 B1 * | 9/2002 | DeMeyer | 428/36.2 |
| 6,533,882 B1 * | 3/2003 | Woodside | 156/166 |
| 6,572,306 B2 * | 6/2003 | Prusak | 405/183.5 |
| 6,601,600 B1 * | 8/2003 | Taylor | 137/15.04 |
| 6,619,886 B1 * | 9/2003 | Harrington | 405/184.2 |

(56) References Cited

U.S. PATENT DOCUMENTS

| | | | |
|---|---|---|---|
| 6,627,281 B2* | 9/2003 | DeMeyer | 428/36.1 |
| 6,634,388 B1* | 10/2003 | Taylor et al. | 138/114 |
| 6,641,330 B1* | 11/2003 | Andersen et al. | 405/166 |
| 6,663,808 B2* | 12/2003 | DeMeyer | 264/171.26 |
| 6,670,880 B1* | 12/2003 | Hall et al. | 336/132 |
| 6,691,741 B2* | 2/2004 | Manners | 138/98 |
| 6,708,729 B1* | 3/2004 | Smith | 138/98 |
| 6,721,638 B2 | 4/2004 | Zeitler | 701/23 |
| 6,759,454 B2* | 7/2004 | Stephens et al. | 524/68 |
| 6,759,968 B2* | 7/2004 | Zierolf | 340/854.8 |
| 6,769,454 B2* | 8/2004 | Fraser et al. | 138/127 |
| 6,773,773 B2* | 8/2004 | Hauber | 428/34.4 |
| 6,782,932 B1* | 8/2004 | Reynolds et al. | 156/351 |
| 6,785,004 B2* | 8/2004 | Kersey et al. | 356/478 |
| 6,824,689 B2* | 11/2004 | Wang et al. | 210/660 |
| 6,889,716 B2 | 5/2005 | Lundberg et al. | 138/98 |
| 6,904,343 B2 | 6/2005 | Kang | 701/23 |
| 6,935,376 B1* | 8/2005 | Taylor et al. | 138/98 |
| 6,945,279 B2* | 9/2005 | Baba et al. | 138/137 |
| 6,960,313 B2* | 11/2005 | Waring et al. | 264/36.17 |
| 7,000,643 B2* | 2/2006 | St. Onge et al. | 138/98 |
| 7,025,580 B2* | 4/2006 | Heagy et al. | 425/11 |
| 7,096,890 B2* | 8/2006 | Woolstencroft et al. | 138/98 |
| 7,160,409 B2* | 1/2007 | Reynolds et al. | 156/172 |
| 7,165,579 B2* | 1/2007 | Borland et al. | 138/99 |
| 7,216,674 B2* | 5/2007 | Manners | 138/98 |
| 7,258,141 B2* | 8/2007 | Catha et al. | 138/98 |
| 7,305,287 B2 | 12/2007 | Park | 701/23 |
| 7,374,127 B2* | 5/2008 | Gallagher et al. | 242/444 |
| 7,476,348 B2* | 1/2009 | Waring | 264/36.17 |
| 7,517,212 B2* | 4/2009 | Blackmore et al. | 425/460 |
| 7,527,076 B2* | 5/2009 | Lepola et al. | 138/98 |
| 7,548,697 B2 | 6/2009 | Hudson et al. | 398/106 |
| 7,648,329 B2 | 1/2010 | Chilson et al. | 414/809 |
| 7,706,917 B1 | 4/2010 | Chiappetta et al. | 700/245 |
| 7,740,099 B2 | 6/2010 | Field et al. | 180/282 |
| 7,824,595 B2* | 11/2010 | Appleby et al. | 264/316 |
| 7,849,883 B2* | 12/2010 | Manners | 138/98 |
| 7,857,088 B2 | 12/2010 | Field et al. | 180/282 |
| 7,870,874 B2* | 1/2011 | Quigley et al. | 138/98 |
| 7,876,927 B2 | 1/2011 | Han et al. | 382/104 |
| 7,922,641 B2 | 4/2011 | Maddeleni et al. | 493/288 |
| 7,979,179 B2 | 7/2011 | Gansler | 701/38 |
| 8,082,954 B2* | 12/2011 | Rytter | 138/126 |
| 8,146,639 B2* | 4/2012 | Zhang | 156/356 |
| 8,210,791 B2 | 7/2012 | Chilson et al. | 414/809 |
| 8,567,448 B2* | 10/2013 | Stringfellow et al. | 138/98 |
| 8,567,450 B2* | 10/2013 | Sringfellow et al. | 138/98 |
| 8,641,326 B2* | 2/2014 | Dimitroff | F16L 55/1658 405/156 |
| 2002/0124898 A1* | 9/2002 | Renaud et al. | 138/98 |
| 2002/0189749 A1* | 12/2002 | Shieh | 156/172 |
| 2003/0051795 A1* | 3/2003 | Burgess | 156/169 |
| 2003/0206989 A1* | 11/2003 | DeMeyer | 425/392 |
| 2004/0025951 A1* | 2/2004 | Baron et al. | 138/98 |
| 2004/0144440 A1* | 7/2004 | Lundberg et al. | 138/130 |
| 2006/0099035 A1* | 5/2006 | Wentworth | F16L 1/028 405/184.1 |
| 2006/0124188 A1* | 6/2006 | Catha et al. | 138/98 |
| 2006/0151656 A1* | 7/2006 | Gallagher et al. | 242/437 |
| 2006/0197262 A1* | 9/2006 | Waring | 264/516 |
| 2008/0281534 A1* | 11/2008 | Hurley | 702/47 |
| 2009/0294567 A1* | 12/2009 | Witmer et al. | 242/419 |
| 2009/0308475 A1* | 12/2009 | Stringfellow et al. | 138/98 |
| 2011/0100498 A1* | 5/2011 | Manners | 138/98 |

OTHER PUBLICATIONS

In situ manufacturing: Pipe relining in demanding corrosive environments; High Performance Composites, Jan. 2007, pp. 34-38.

Plastic Pipe: Expect Better Materials; Stidger; Gas Utility Manager; Dec. 2003; pp. 38, 39.

Leakage Detection Using Fiber Optics Distributed Temperature Monitoring; Nikles et al; SPIE; Mar. 2004; 8 pp.

Health Monitoring of a Pipeline Based on Distributed Strain and Temperature Measurements; Glistic et al; SMARTEC SA; 2003; 9 pp.

* cited by examiner

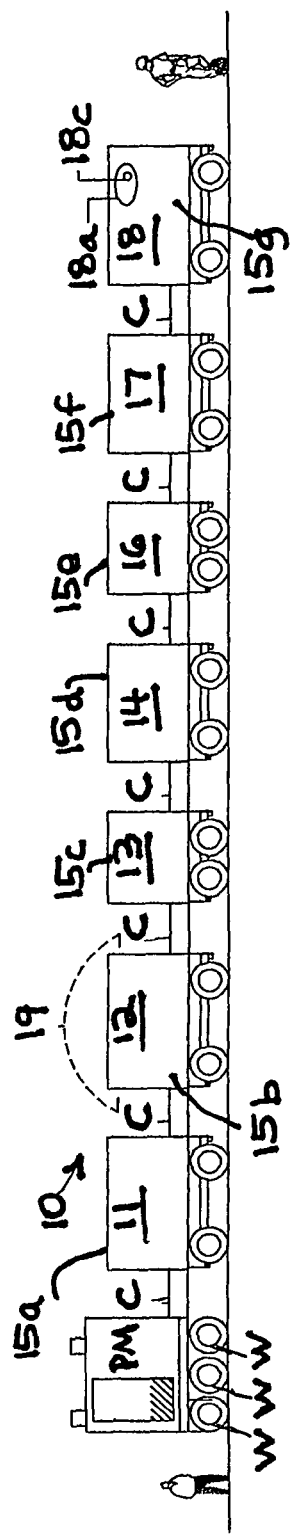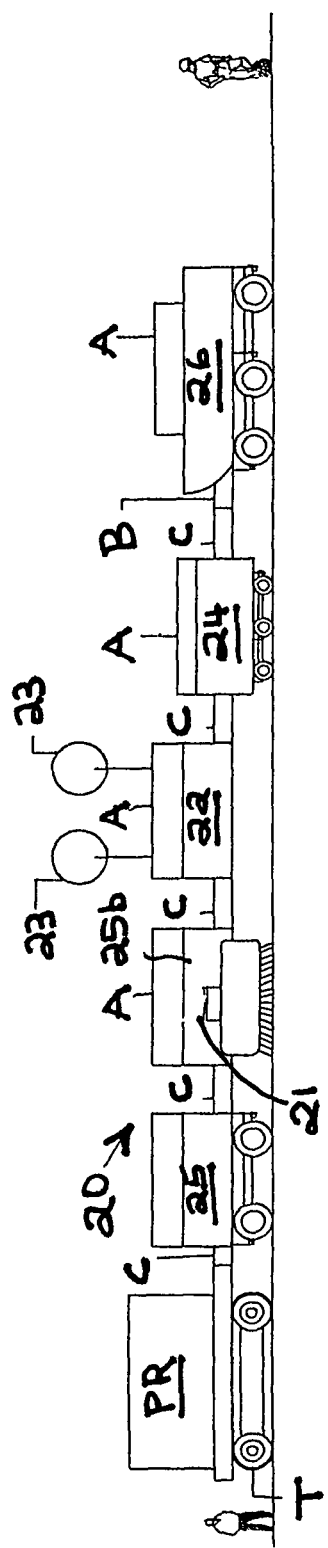

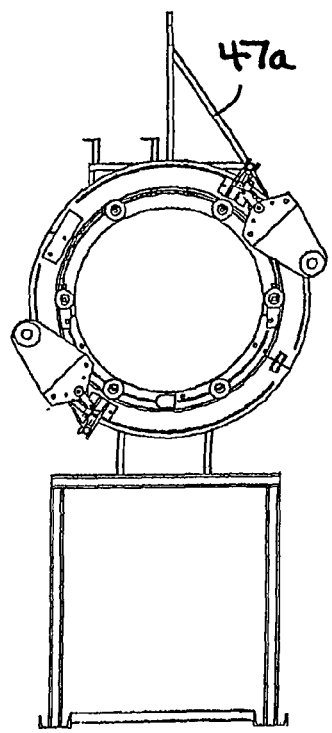
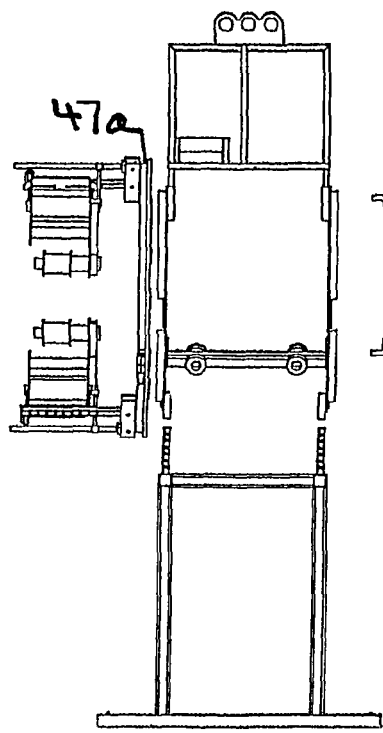
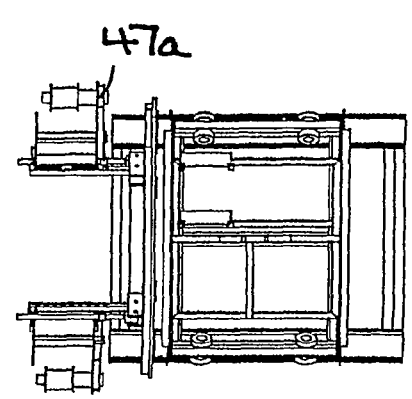
Fig. 6A   Fig. 6B   Fig. 6C
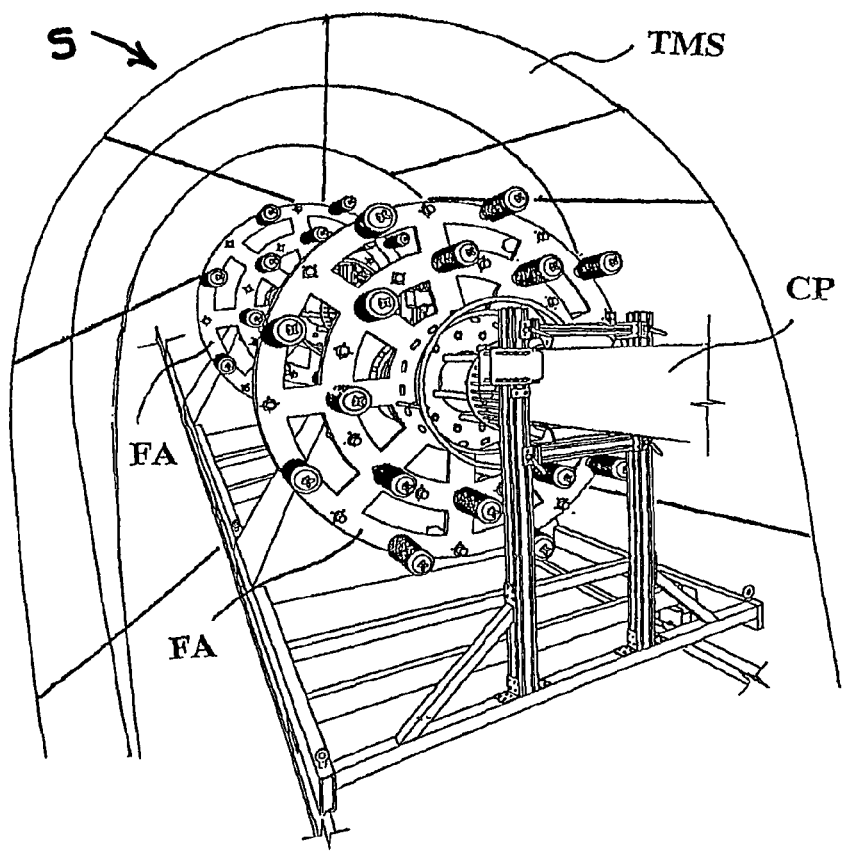
Fig. 7

US 9,453,606 B2

MOVABLE FACTORY FOR SIMULTANEOUS MOBILE FIELD MANUFACTURING AND INSTALLATION OF NON-METALLIC PIPE

RELATED APPLICATIONS

This is a continuation-in-part of and applicants claim priority under the Patent Laws from pending applications: U.S. patent application Ser. No. 12/455,582 filed Jun. 3, 2009 and Ser. No. 12/317,376 filed Dec. 22, 2008; and pending PCT Application Int'l Application No. PCT/GB2010/052041, Int'l filing date Dec. 2, 2010 which claims priority from U.S. Patent Application Ser. No. 61/283,651 filed Dec. 7, 2009—all said applications incorporated fully herein for all purposes.

BACKGROUND OF THE INVENTION

1. Field of the Invention

This present invention is directed to systems and methods for making pipe; to pipe made by such systems; to such systems and methods in which the apparatuses, devices, enclosures, and equipment used to make pipe are present in a single system which is transportable; to systems and methods for treating, rejuvenating, and processing already-existing pipe; to systems and methods for a transportable factory for simultaneous mobile field manufacturing and installation; and, in certain particular aspects, to a fully transportable system for making non-metallic pipe at or near a site of final use of the pipe, optionally with apparatus to coat or cover the pipe as part of the system.

2. Description of Related Art

A variety of systems and methods are known for handling pipe, making pipe, and protecting pipe, including non-metallic pipe. Such systems and apparatuses include those disclosed in these exemplary U.S. patents and applications (given by way of example only and not as an exhaustive listing): U.S. Pat. Nos. 7,870,874; 7,374,127; 258,141; 7,160,409; 7,000,643; 6,960,313; 6,889,716; 6,769,454; 6,601,600; 6,708,729; 6,634,388; 6,357,485; 6,305,423; 6,299,803; 6,286,557; 6,220,079; 6,148,866; 6,065,400; 6,058,978; 5,828,003; 5,762,450; 5,755,266; 5,551,484; 5,395,472; 5,374,174; 5,551,484; 5,072,622; 4,998,871; 4,985,196; 4,863,365; 4,776,370; 4,985,196; 4,685,983; 4,668,125; 4,384,595; 4,064,211; 4,053,343; 4,000,759; 3,769,127; and 2,502,638, and U.S. patent application Ser. No. 11/172,132 filed Jul. 1, 2005; Ser. No. 11/033,962 filed 12 Jan. 2005—all of which are incorporated fully herein by reference for all purposes.

BRIEF SUMMARY OF THE INVENTION

In one aspect, the present invention discloses a system for making multi-component pipe, the system, in certain aspects, including a plurality of apparatuses, certain of the apparatuses for applying, wrapping, or constructing a particular component on the pipe, each apparatus supported on a support, the supports interconnected together so that each support can move relative to a support or supports to which it is connected. In certains such systems the system is transportable, or mobile, or both. In one aspect, such a system makes pipe as it moves, leaving behind finished pipe.

The present invention discloses, in certain embodiments, systems and methods for making pipe in which apparatuses, devices, enclosures, and equipment used to make the pipe are present in a single system which is portable. In certain aspects, the present invention discloses a transportable factory for simultaneous mobile field manufacturing and installation for making and installing pipe. In certain aspects, such systems and methods are capable of making pipe at or near a site of the final use of the pipe, e.g., along a pipeline's right-of-way. Optionally, pipe thus made can be transported to an installation site or to an end user, e.g., but not limited to as a pipeline or a water pipe. Optionally, apparatus to coat or cover the pipe is part of the system.

In certain such systems, the system includes apparatuses for installing the pipe, e.g., but not limited to, in a trench or pipeline. In certain such systems the pipe that is made is: stand-alone pipe; stand-alone pipe for lining an existing conduit, e.g., but not limited to, an existing pipeline; or a stand-alone pipe acting as a liner in a damaged or corroded pipeline.

In certain such systems, the pipe making apparatuses include one, some, or all of: a prime mover; a control system; pipe handling apparatus; pipe taping apparatus; work and living quarters; power source; pipe positioning apparatus; pipe instrumenting apparatus; pipe covering or coating apparatus; and/or pipe laying apparatus. There may be multiples of any of these apparatuses.

In certain aspects of such systems, the system is designed and configured for movement over rough, irregular, or environmentally sensitive surfaces (e.g., terrain or water). Supports for the various apparatuses can be connected so that supports are movable and/or articulable with respect to each other or to a prime mover with relative motion between supports and, in some aspects, with three axes of motion or degrees of freedom; in one aspect with simultaneous coordination of the ratio of linear speed of the system to rotational speed of system components. In certain aspects, such systems and methods provide for the manufacture of pipe with automated controls which control linear, horizontal, and vertical motion of system components while simultaneously coordinating the ratio of linear speed of components of the system to:rotational speed of components thereof or to rotational speed of pipe to which layers and/or wraps and/or tapes and/or sensor(s) are being applied.

In one particular aspect, using such systems according to the present invention a reinforced thermoplastic pipe is made which has a core pipe (e.g., made of high density polyethylene) with high strength reinforcing and/or pressure bearing fabrics, materials, and/or tapes, structural windings, fiber optic sensors, and/or covering(s).

In one particular aspect, such systems according to the present invention are used to make a pipe that includes: a base pipe made of temperature-resistant non-metallic corrosion-resistant material with a flow channel therethrough; one, two, or more strengthening wraps; a plurality of spaced-apart axial strength members on the base pipe; a protective outer wrap; at least one fiber optic sensor that provides signals indicative of tension applied to the pipe, leaks of the pipe, movement of the pipe, and/or temperature along the pipe; and an additional wrap or wraps to secure the axial strength members and sensors in place. In certain aspects, the axial strength members are pulling tapes. Such pipe is disclosed in pending U.S. patent application Ser. No. 12/455,582 filed Jun. 3, 2009 and Ser. No. 12/317,376 filed Dec. 22, 2008).

In one aspect, the present invention discloses a stationary manufacturing plant with a fixed factory in which a core pipe moves through a central axis of the factory; and in another aspect, the present invention discloses a factory that traverses a core pipe, e.g., a factory that moves and traverses a rotating core pipe (e.g., these alternatives as described in pending U.S. patent application Ser. No. 12/455,582 filed Jun. 3, 2009 and Ser. No. 12/317,376 filed Dec. 22, 2008). Optionally a communication cable or cables and/or a power cable or cables may be included on the pipe, on top of or under any desired layer or tape or wrap.

In one aspect, the present invention disclose methods for manufacturing and making thermoplastic reinforced pipe with a core pipe stationary while a factory moves along the core pipe's length applying reinforcing materials. In certain aspects, such a method has no practical length limitation for manufacturing a continuous stand-alone pipe; e.g., systems and methods according to the present invention may be used to make a pipe whose length is ten miles, one hundred miles, seven hundred and fifty miles, up to a thousand miles or more.

The present invention discloses systems and methods for the simultaneous mobile field manufacturing and installation of thermoplastic reinforced pipe. In certain aspects, a factory according to the present invention is deployed so that the factory manufactures while moving and traversing an axis of a core pipe.

In certain aspects, the present invention provides manufacturing systems for making a base pipe that serves as a liner for a host pipe; e.g., but not limited to, a liner as disclosed in pending U.S. patent application Ser. No. 12/455,582 filed Jun. 3, 2009 and Ser. No. 12/317,376 filed Dec. 22, 2008.

The present invention, in certain aspects, discloses transportable and/or mobile systems for making pipe; methods for using such systems; and pipe made by such systems. In certain particular aspects, such systems are used to make non-metallic pipe of any desired length which serves as stand-alone pipe for use at the location at which it is made. In other aspects, systems and methods are provided for rejuvenating already-existing pipe.

Certain systems according to the present invention include a plurality of interconnected components and parts, some or all of which are transportable, e.g., from a location at which the parts are combined to a location at which pipe is to be made. In certain aspects, such systems include various parts: apparatus for receiving and handling pipe, e.g. for unloading sections of pipe and for moving them from an unloading station; pipe positioning apparatus for positioning pipe sections for further processing, in one aspect, a computer controlled apparatus; pipe combination apparatus for connecting smaller pipe sections to form larger pieces of pipe, e.g., welding apparatus; pipe wrapping apparatus or apparatuses for wrapping pipe with one or more pieces and/or layers of protective and/or strengthening material; a control system or systems for each apparatus and/or for the system as a whole; and, optionally, an enclosure or enclosure for the various parts—all such parts referred to collectively as "apparatuses, etc."

Optionally, pipe apparatus for making an outer protective cover is included in such a system. Optionally, pipe taping apparatus is included in such a system. Optionally, each apparatus has its own dedicated enclosure or an entire system has an enclosure. Optionally, an entire system according to the present invention has a controlled-environment enclosure that moves during manufacturing with the system apparatuses.

In certain embodiments of systems according to the present invention and of methods using such systems, each of the apparatuses is mounted (permanently or removably) on a support that is transportable. For example, on a vehicle; a platform; an all terrain vehicle; a flatcar; a skid: a wheeled vehicle with two or more wheels and/or tires; a car; a flatbed; a truck; a trailer; an all terrain vehicle ("ATV"); a platform; a sled; and/or a barge-all collectively referred to as "vehicles, etc."

Vehicles, etc. can include, in a transportable system according to the present invention, a vehicle or vehicles that transport pieces of pipe and other materials and things used in the pipe making process; or these materials and things can be brought to the pipe making site by other means, e.g., but not limited to, by helicopter, plane, tracked vehicle, or truck.

In certain aspects, the vehicles etc. used with systems according to the present invention are: wheeled vehicles; vehicles with drivable/movable tracks; hovercraft; balloon-supported vehicles; and/or amphibious vehicles and such vehicles are included in the term "vehicles, etc."

The present invention provides, in certain embodiments, apparatuses etc. according to the present invention are transportable either to a site at which a system according to the present invention is assembled or to a site at which pipe is to be made. In certain aspects, an entire production system according to the present invention is a mobile field manufacturing and installation system and is deployed in a configuration that enables conduct of a manufacturing process while moving, i.e., in a transportable mode. In one aspect, a system according to the present invention is transportable on water, e.g., over a lake, river, sea, or ocean, e.g., on a boat or barge.

In certain aspects, each component or part of a system according to the present invention is connected to an adjacent component, part or parts for transport. In certain aspects, these connections are articulable and/or disconnectible as desired. In certain aspects, the parts are connected with a joint, hitch, assembly or connection that provides one or two degrees of freedom between parts. In other aspects, these connections provide each part with one, two or three degrees of freedom of movement with respect to each other part to which it is connected.

In certain aspects, such connections provide a degree of relative movement between apparatuses and/or components. Such connection enhances a system's ability to traverse rough, steep, wet, mountainous, frozen, and/or irregular terrain; for example, tundra, steppe, swamp, desert, wetlands, and coastal plains. In one aspect, such systems and the apparatuses, etc. are controlled by a computerized control system with appropriate software, components, hardware, transmitters, cables, wiring, and/or connections. In one embodiment, such a control system is used, among other things, to facilitate the movement of the system and the movement of each separate part, e.g. over rough, etc., terrain. Control can be on-site and/or remote.

In one aspect, such a control system is used, among other things, to facilitate a transportable mode of a factory according to the present invention and the movement of each separate component, vehicle, and apparatus, e.g., over rough terrain. Any connection between any two apparatuses or an apparatus and a prime mover can include shock absorbing apparatus.

In certain embodiments of systems according to the present invention, a pipe taping apparatus or apparatuses is included to apply a tape or tapes to a pipe to which a wrap or wraps have been applied. In one aspect, a pipe taping apparatus (or apparatuses) is movable with a first transport system and the remaining apparatuses are movable by a second transport system. In another aspect, all the apparatuses, including the apparatuses, etc. and a pipe taping apparatus, are movable by a single transport system.

In certain embodiments of such systems according to the present invention, the vehicles, etc. are configured and sized for transport to a site by train; plane; glider; helicopter; boat; land vehicle; hovercraft; lighter-than-air transport; balloon; or by parachute drop. The site can be a site at which the transportable factory is assembled or a site at which pipe is to be made.

In certain embodiments of the present invention, systems are provided which make a pipe that is ready for use by an end user; e.g., but not limited to, as a pipeline or water pipe. In other aspects, systems according to the present invention make a base pipe that serves as a liner for a host pipe; e.g., but not limited to, and soley by way of example, a liner as disclosed in U.S. patent Applications Publication Nos. 2009/0205733 and 2009/0308475, both co-owned with the present application and incorporated fully herein for all purposes.

In certain aspects, the present invention provides, as part of the "apparatuses, etc.," accommodations for a variety of actions, e.g., an office, crew living quarters, power generation facility, and/or a'control room or facility.

In one aspect, the present invention discloses a stationary manufacturing plant with a fixed factory in which a core pipe moves through a central axis of the factory; and in another aspect, the present invention discloses a factory that traverses a core pipe, e.g., a factory that moves and traverses a rotating core pipe (e.g., these alternatives as described in pending U.S. patent application Ser. No. 12/455,582 filed Jun. 3, 2009 and Ser. No. 12/317,376 filed Dec. 22, 2008).

The present invention discloses systems and methods for the simultaneous mobile field manufacturing and installation of thermoplastic reinforced pipe. In certain aspects, a factory according to the present invention is deployed so that the factory manufactures while moving and traversing an axis of a core pipe.

In certain aspects, the present invention provides manufacturing systems for making a base pipe that serves as a liner for a host pipe; e.g., but not limited to, a liner as disclosed in co-owned pending U.S. patent application Ser. No. 12/455,582 filed Jun. 3, 2009 and Ser. No. 12/317,376 filed Dec. 22, 2008.

Accordingly, the present invention includes features and advantages which are believed to enable it to advance transportable factory pipe making technology. Characteristics and advantages of the present invention described above and additional features and benefits will be readily apparent to those skilled in the art upon consideration of the following detailed description of preferred embodiments and referring to the accompanying drawings. What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide:

New, useful unique, efficient, nonobvious transportable systems and methods for making pipe; in one aspect, a portable factory for making non-metallic stand-alone pipe or for making a base pipe to line a host pipe;

New, useful unique, efficient, nonobvious transportable systems and methods for making pipe while in a transportable mode; in certain aspects, a portable factory for making non-metallic stand-alone pipe, thermoplastic reinforced pipe, or for making a base pipe to line a host pipe;

Such new, useful, unique, efficient, nonobvious systems and methods which are movable over environmentally sensitive, rough, difficult, or irregular terrain; and/or Such new, useful unique, efficient, nonobvious systems and methods in which a control system controls each separate transportable component and part of the system in transit and while used in pipe production;

New, useful unique, efficient, nonobvious transportable systems in which each component and part of the system is free to move with respect to adjacent components and parts;

Such systems and methods in which the parts are articulable with respect to each other and/or can move with three degrees of freedom with respect to each other;

Such systems and methods in which the parts are articulable with respect to one another and/or can move with a degree of relative motion with respect to one another; and, optionally, supports for the various apparatuses can be connected so that supports are movable and/or articulable with respect to each other or to a prime mover with relative motion between supports and, in some aspects, with three axes of motion or degrees of freedom; in one aspect with simultaneous coordination of the ratio of linear speed of components of the system to rotational speed of system components; and in certain aspects, such systems and methods which provide for the manufacture of pipe with automated controls which control linear, horizontal, and vertical motion of system components while simultaneously coordinating the ratio of linear speed of components of the system to rotational speed of components thereof or to rotational speed of rotating pipe;

Systems and methods for making pipe at a site at which the pipe is to be used; and Such new, useful unique, efficient, nonobvious systems and methods in which a base pipe useful as a liner is made.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated.

There are, of course, additional aspects of the invention described below and which may be included in the subject matter of the claims to this invention.

Those skilled in the art who have the benefit of this invention, its teachings, and suggestions will appreciate that the conceptions of this disclosure may be used as a creative basis for designing other structures, methods and systems for carrying out and practicing the present invention.

The claims of this invention are to be read to include any legally equivalent devices or methods which do not depart from the spirit and scope of the present invention.

The present invention and its diverse embodiments recognize and address the long-felt needs and provides a solution to problems and a satisfactory meeting of those needs in its various possible embodiments and equivalents thereof.

To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings.

The detail in these descriptions is not intended to thwart this patent's object to claim this invention no matter how others may later disguise it by variations in form, changes, or additions of further improvements.

It will be understood that the various embodiments of the present invention may include one, some, or any possible combination of the disclosed, described, and/or enumerated features, aspects, and/or improvements and/or technical advantages and/or elements in claims to this invention.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate embodiments preferred at the time of filing for this patent and are not to be used to improperly limit the scope of the invention which may have other equally effective or legally equivalent embodiments.

FIG. 1 is a schematic view of a system according to the present invention.

FIG. 2 is a schematic view of a system according to the present invention.

FIG. 6A is an end view of a taping apparatus as used in a system according to the present invention as in FIG. 4.

FIG. 6B is a side view of the apparatus of FIG. 7A.

FIG. 6C is a top view of the apparatus of FIG. 7A.

FIG. 7 is a schematic isometric view of a system according to the present invention.

Figure 3A:
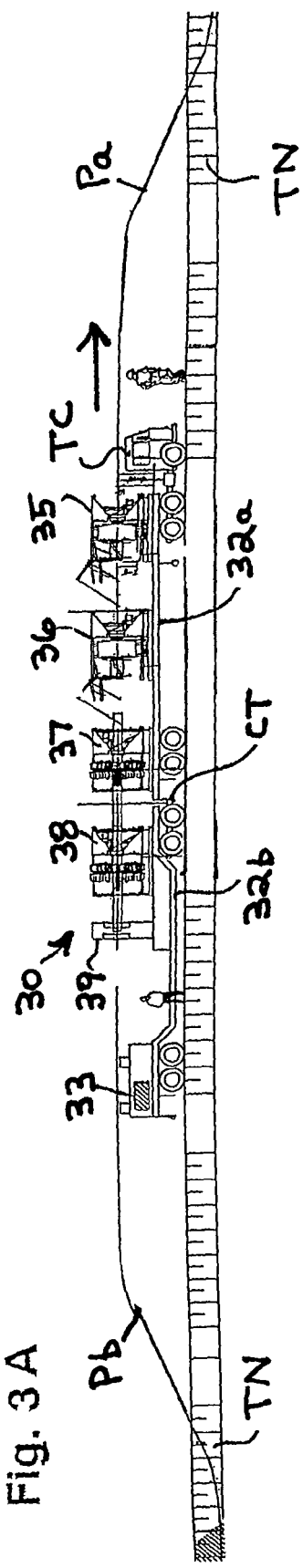
FIG. 3A is a side schematic view of a system according to the present invention.

Certain embodiments of the invention are shown in the above-identified figures and described in detail below. Various aspects and features of embodiments of the invention are described below.

Any combination of aspects and/or features described below can be used except where such aspects and/or features are mutually exclusive.

It should be understood that the appended drawings and description herein are of certain embodiments and are not intended to limit the invention.

On the contrary, the intention is to cover all modifications, equivalents and alternatives falling within the spirit and scope of the invention as defined by the appended claims. In showing and describing these embodiments, like or identical reference numerals are used to identify common or similar elements.

The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiments, and are not intended to mean the claimed invention of any particular embodiment.

Accordingly, the subject or topic of each such reference is not automatically or necessarily part of, or required by, any particular embodiment.

So long as they are not mutually exclusive or contradictory any aspect or feature or combination of aspects or features of any embodiment disclosed herein may be used in any other embodiment disclosed herein.

The present invention includes a variety of aspects, which may be combined in different ways. The following descriptions are provided to list elements and describe some of the embodiments of the present invention, including those preferred at the time of filing for this patent. These elements are listed with initial embodiments, however it should be understood that they may be combined in any manner and in any number to create additional embodiments.

The variously described examples and preferred embodiments should not be construed to limit the present invention to only the explicitly described systems, techniques, methods and applications. Further, this description should further be understood to support and encompass descriptions and claims of all the various embodiments, systems, techniques, methods, devices, and applications with any number of the disclosed elements, with each element alone, and also with any and all various possible permutations and combinations of all elements in this or any subsequent application.

DETAILED DESCRIPTION OF THE INVENTION

FIG. 1 shows schematically a system 10 according to the present invention for making pipe that is transportable and movable to a desired site at which pipe is to be made. The system 10 has a prime mover PM with wheels W that moves a plurality of interconnected wheeled cars 15 each with apparatus and/or structure thereon used in making pipe.

Any suitable known connection device or apparatus may be used for connecting the various parts and components of a transportable system according to the present invention; including, but not limited to, known connectors, hitches, joints, assemblies and mechanisms which provide one, two or three degrees of freedom between vehicles, parts, apparatuses, or components; including, but not limited to, those disclosed in U.S. Pat. Nos. 7,255,047; 6,802,275; 6,321,851; 6,186,693; 5,974,348; 5,764,014; 5,706,901; 5,355,971; 4,437,680; 3,974,907; 2,755,105; and 2,696,392. Any suitable known control system (in, near or on a system part or component; or remote from the system) may be used to control the parts and components of a movable (e.g., a factory system according to the present invention which is transportable, mobile, or both), during initial assembly of the system; during transport; and during use of the system on site. Such known control systems include, not by way of limitation, those in the U.S. patents cited previously and those in U.S. Pat. Nos. 4,042,255; 5,925,080; 6,438,456; 6,445,984; 6,721,638; 6,904,343; 7,305,287; 7,548,697; 7,648,329; 7,706,917; 7,740,099; 7,857,088; 7,876,927; and 7,979,179, as well as known control systems for each part or component of a system according to the present invention.

A connector C connects the prime mover PM to a first car 15a which supports pipe handling apparatus 11. This car 15a is connected by a connector C to a car 15b which supports pipe positioning apparatus 12. This car 15b is connected by a connector C to a car 15c that supports pipe moving apparatus 13.

A connector C connects the car 15c to a car 15d that supports pipe taping apparatus 14. The car 15d is connected with a connector C to a car 15e that supports tape dispensing apparatus 16. It is within the scope of the present invention for the apparatus 16 to be on the car 15d.

A connector C connects the car 15e to a car 15f that supports pipe covering apparatus 17. The car 15f is connected to a car 15g that supports accommodation structure 18. This accommodation structure may include a room or rooms for a control system; living quarters; power source(s) and/or generators; and/or office space. Multiple cars 15g may be used as needed.

The connectors C may be any suitable known connector for releasably connecting the cars 15 to each other or to the prime mover PM. In certain particular aspects, the connectors C are connectors that allow two cars, or a car and a prime mover, to move with respect to each other in one, two, or three possible axes or directions. Each car 15 and/or the prime mover PM may have its own enclosure such as the enclosure 19 shown in dotted line over the car 15b; or an enclosure can be provided at a pipe making site that covers all or most of the cars.

The cars for the various apparatuses can be connected so that they are movable and/or articulable with respect to each other or to a prime mover with relative motion between cars and, in some aspects, with three axes of motion or degrees of freedom. In one aspect, regarding components of the system that apply components of the pipe, there is simultaneous coordination of the ratio of linear speed of components of the system to rotational speed of system components. In certain aspects, such systems and methods provide for the manufacture of pipe with automated controls which control linear, horizontal, and vertical motion of system components while simultaneously coordinating the ratio of linear speed of components of the system to rotational speed of components thereof.

A control system 18a shown on the car 15g may be in any other desired location and on any other car or on the prime mover PM. The control system 18a is in communication with all of the apparatuses and components of the system 10, by wire and/or wirelessly, on-site and/or remotely, and can control the system 10 and its components during initial assembly, during transport of the system 10, and during a pipe making operation, a pipe treating operation, or a pipe covering operation. A component 18c provides communication with the system 18a, either on-site, remote, or both.

FIG. 2 shows schematically a system 20 according to the present invention with items connected by connectors C (as in FIG. 1). A prime mover PR with driven tracks T (one on each side of the vehicle, one shown) is connected to a wheeled car 25 by a connector C. A car 25b is connected to a hovercraft 21 which itself is connected to a car 22 which is supported by lighter-than-air balloons 23.

The car 22 is connected to an all terrain vehicle 24 which is connected by a connector C and a shock absorber B to an amphibious vehicle 26. Any connection between any two cars, vehicles, or items in any system according to the present invention may employ a shock absorbing apparatus or structure. Each car of the system 20 supports an apparatus or item A which may be any of the apparatuses, machines, devices, control systems, or equipment disclosed herein for use in a portable factory. It is within the scope of the present invention to have a system with multiples of any of the cars or vehicles shown for the system 10 and/or the system 20; for example, and not by way of limitation, a system according to the present invention may be made up of all hovercraft vehicles, of all amphibious vehicles, or of a combination of wheeled cars 15 and lighter-than-air balloon-supported car(s).

For any system according to the present invention, any suitable prime mover may be used for moving the system; including, but not limited to, trucks, tractors, SUV's, automobiles, ATV's, and tracked vehicles (e.g., but not limited to, for the prime movers in the systems of FIGS. 1-4).

Figure 3B:
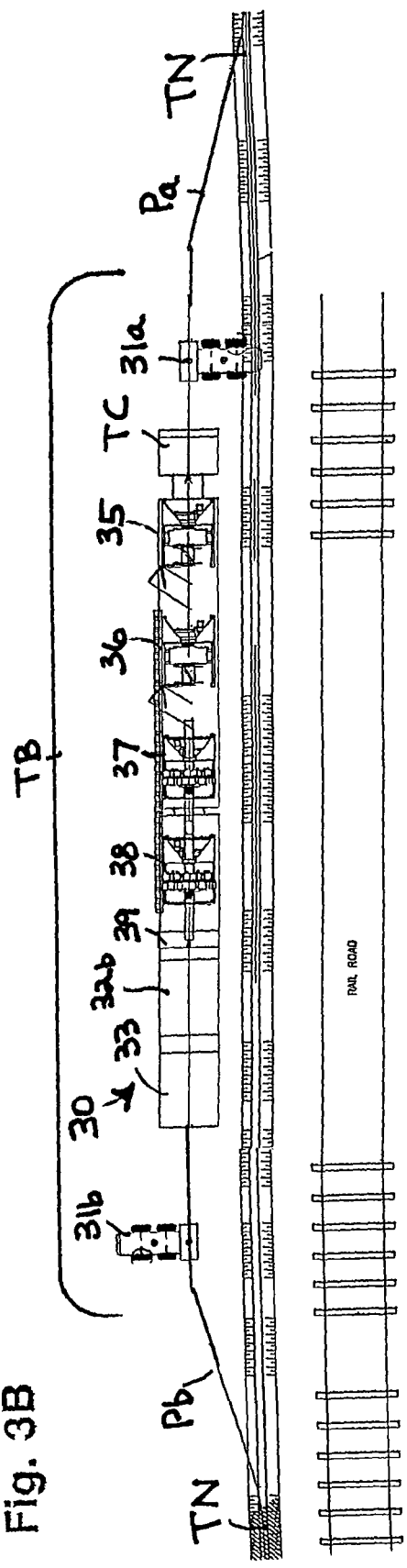
FIG. 3B is a plan schematic view of the system of FIG. 3A.

FIGS. 3A and 3B show a system 30 according to the present invention which makes pipe for emplacement into a trench TN or which removes already-existing already-laid pipe from the trench TN, treats and processes the pipe (e.g., but not limited to, taping, wrapping, treating, covering, instrumenting), and then re-lays the pipe back into the trench TN.

Pipe handlers 31a and 31b move the pipe from and then back into the trench TN. They also move the pipe through the various parts and components of the system 30. As is true for any embodiment hereof, a single pipe mover may be used and any suitable apparatus for moving such pipe may be used. In one particular aspect, a pipe mover connected to a Bobcat (trademark) machine is used.

In the system 30 the various major parts and components are mounted on trailers 32a and 32b which are moved by a truck TC. The two trailers 32a, 32b are connected with a connection CT which may be any suitable connection, any connection disclosed herein, and/or a connector C as in FIGS. 1 and 2. As is true for any system according to the present invention, multiple parts and/or components of a system may be on one trailer, one support, or one vehicle etc.

As pipe Pa is removed from the trench TN and processed by the system 30, the truck TC moves the system 30 along the trench TN. Processed pipe Pb exits from the rear of the system 30 and is re-laid in the trench TN. Initially the pipe Pa is fed to a taper 35 that applies material onto the pipe Pa. In one aspect, the taper 35 is a contra helical orbital taper. The pipe from the taper 35 is fed to a taper 36 that applies material onto the pipe; e.g., in a reverse manner compared to the material wound on by the taper 35. In one aspect, the taper 36 is a helical orbital taper. The "applied "material" may be high strength reinforcing and/or pressure bearing fabric, tape, structural windings, fiber optic sensors, and/or covering(s).

Pipe from the taper 36 is fed to a winder head 37 that applies structural windings onto the pipe. In one aspect, the head 37 is a contra helical winder head. Pipe from the head 37 is fed to a winder head 38 which applies structural windings onto the pipe; in one aspect, in a reverse manner as compared to the winding done with the head 37. In one aspect, the head 38 is a helical tape head. Taper(s) and winding head(s) can be flip-flopped to accomplish winding first and then apply material with the taper(s).

Optionally, the system 30 includes an outer cover apparatus 39 that applies an outer cover or coating to pipe received from the head 38. Possible covers and coatings include polyolefins, extruded covers, applied tapes, welded sheets, spray-on materials, synthetic rubbers, sleeve-type covers, temperature insulated covers, nanoenhanced material, electrical insulated covers, and specialty covers that mitigate or negate permeation. Optionally, metallic covers or layers can be added to mitigate permeation, provide protection, and provide structural resistance to buckling. Optionally a cover or covers can be added to mitigate accumulation of static electricity, e.g., but not limited to, aluminized MYLAR (trademark) material.

A power system 33 supplies power for the parts and components of the system 30. Optionally, the system 30 is positionable by a rail road RR, either one already existing at the work site or one that is made at the work site for the pipe operation. Optionally, a work table TB is provided adjacent the system 30.

Figure 4B:
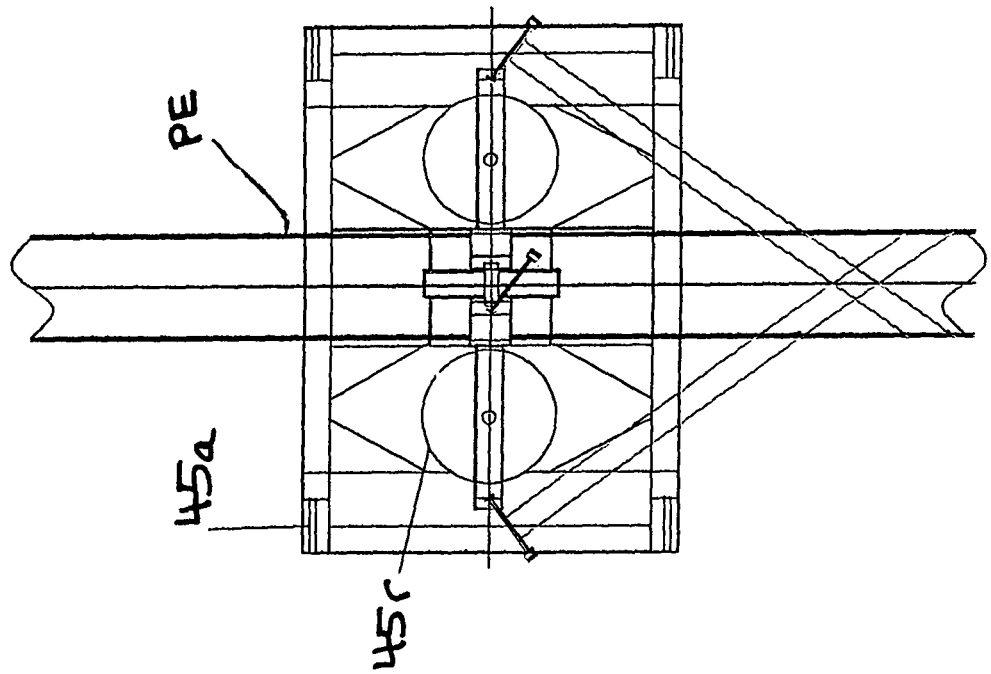
FIG. 4B is a plan schematic view of part of the system of FIG. 4.
Figure 4A:
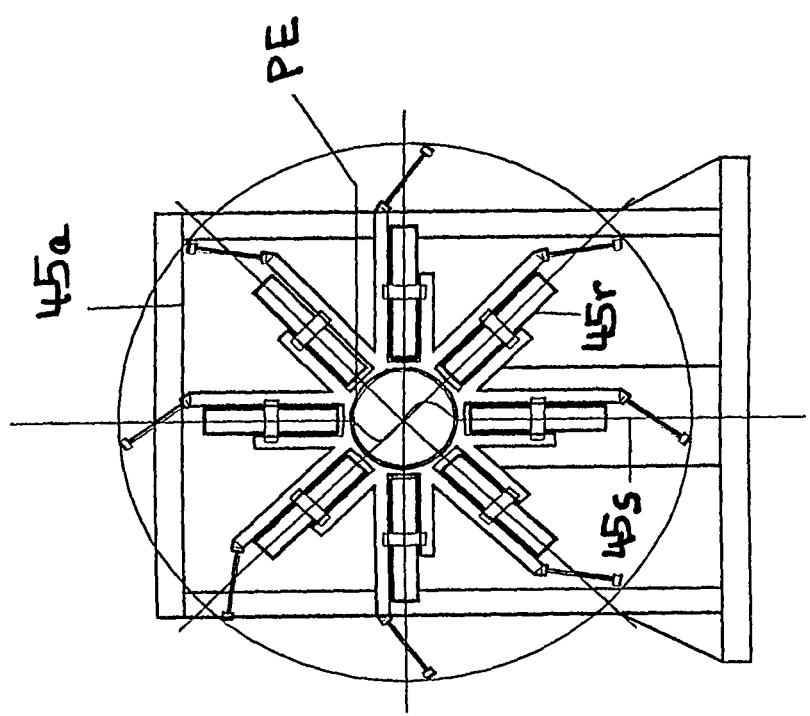
FIG. 4A is a schematic front view of part of the system of FIG. 4.
Figure 4:
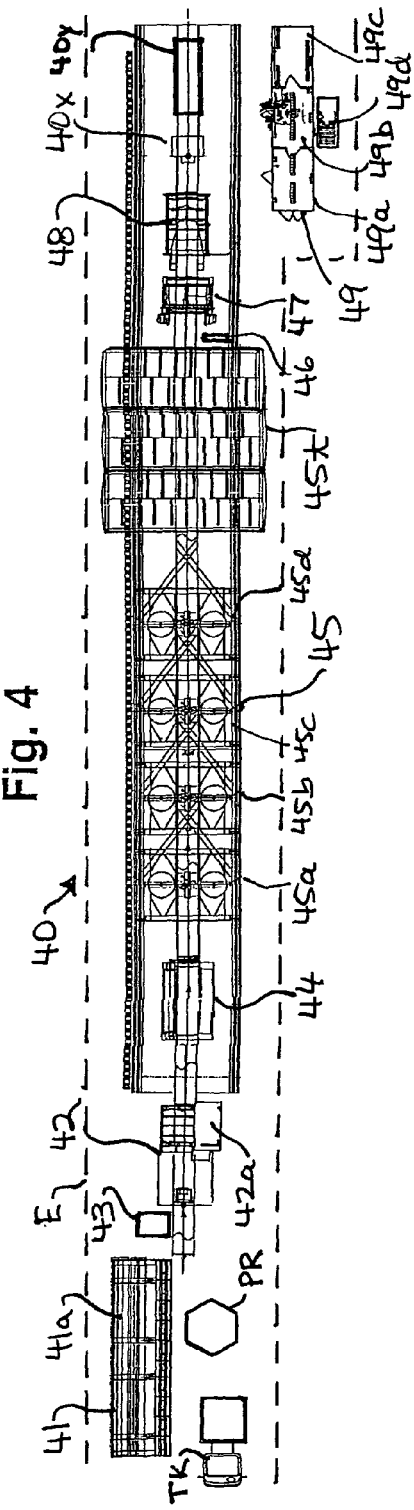
FIG. 4 is a plan schematic view of a system according to the present invention.

FIG. 4 illustrates a system 40 according to the present invention which is a transportable factory for making pipe. Each item, station, apparatus, piece of equipment, device, and enclosure of the system 40 can be transported to a pipe-making site using any of the vehicles and prime movers disclosed herein. An enclosure E, shown in dotted line, encloses the system 40 and can be any structure, building, tent, etc. used for personnel, apparatuses, equipment, offices, control systems, and/or power systems; or such things can have their own dedicated enclosures all of which are transportable with the system 40 or which can be separately brought to the pipe-making site.

In one embodiment, a continuous pipe is made on site with a pipe extrusion machine PR and the produced continuous pipe is fed to the taping apparatuses described below. In another embodiment, as shown in FIG. 4, sections of pipe are brought to the pipe-making site as part of a transportable system or such sections are delivered to a pipe making site. As shown in FIG. 4, a pipe handling system 41 receives pipe sections 41a delivered by trucks TK. The pipe sections 41a are racked on the system 41 and the system 41 then supplies pipe sections 41a to a connection apparatus 42. A positioning system 43 correctly positions the pipe sections 41a to facilitate movement of the pipe sections to and through the connection apparatus 42.

Figure 5C:
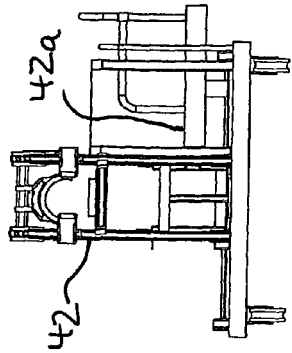
FIG. 5C is an end view of the apparatus of FIG. 5A.
Figure 5A:
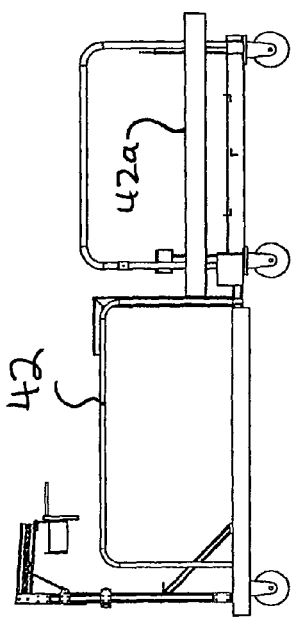
FIG. 5A is a side view of a pipe section connection apparatus as used in a system according to the present invention as in FIG. 4.
Figure 5B:
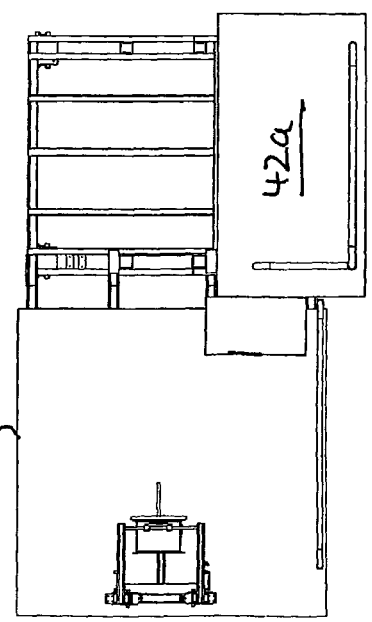
FIG. 5B is a plan view of the apparatus as shown in FIG. 5A.

The connection apparatus 42 can be a butt fusion welding apparatus used to weld together sections of nonmetallic pipe. In one aspect, the apparatus 42 is TracStar (trademark) fusion machine available from McElroy Mfg. Inc. One such apparatus is shown in FIGS. 5A-5C. The apparatus 42 has an inspection platform 42a from which personnel view and inspect fused-together pipe sections before they are moved to a taping station.

A moving apparatus 44 moves the fused pieces of pipe PE to taping apparatus 45. In one aspect, the moving apparatus is a traction belt moving apparatus. In one aspect, the moving apparatus 44 applies continuous tension to the pipe as it moves through the various apparatuses of the system.

The taping apparatuses 45a-45d (e.g. eccentric tapers) apply material (high strength material) which is supplied to the taping apparatus 45 by tape dispensing apparatus 45t, spools 45r and applicator arms 45s.

Any suitable taping machine, tape head device, or taping apparatus may be used to apply the material(s) or tape(s). The heads can be "concentric taper" or "eccentric taper" heads, as desired, of any desired diameter. With a "concentric" configuration, a pipe moves through the apparatus; with an "eccentric" configuration, material is moved around a pipe. As shown in FIG. 4, the system 40 employs four taping heads 45a-45d. In one aspect, the head 45a is a helical tape head; the head 45b is a counter-helical tape head; the head 45c is a helical tape head; and the head 45d is a countra helical tape head.

FIG. 4A is a front view of the helical tape head 45a and FIG. 4B is a plan view of this tape head showing pipe PE passing through the head. Individual tapes 45s are fed through the individual spools 45r and are wound onto the pipe PE facilitated by the arms 45s.

Optionally, pulling tapes and/or fiber optics can be applied to the pipe PE with an apparatus 46. The fiber optics can be any known cables, strands, structures, or fibers, multi-mode or single-mode, used with pipe.

Optionally, the pipe PE is wrapped with protective tape, e.g. Mylar (trademark) tape by a wrapping apparatus 47—in one aspect, as shown in FIGS. 6A-6C, as applicator 47a.

Optionally, a wrapping apparatus 40x(e.g., a commercially available wrapper) longitudinally wraps the pipe PE with a protective cover.

Optionally, a pulling apparatus 40y pulls pipe through the system 40.

Optionally, structure 49 houses an office area, 49a; a control system 49b-like any control system disclosed herein; living quarters 49c; and a power system 49d for providing power to the various parts and components of the system 40.

FIG. 7 shows schematically a system S according to the present invention which is an in situ pipe making system usable for making pipe for relining and existing pipe.

Methods using a system the system S, in certain aspects, integrate off-the-shelf extruded polyethylene, layers of carbon and fiber tape, in on-site manufacturing and installation system which, in certain aspect, replaces various high-performance, high-pressure piping systems.

Certain disclosures of this application are in the article "In situ manufacturing: Pipe relining in demanding corrosive environments," High Performance Composites, Vol. 15, No. 1, January 2007, incorporated fully herein for all purposes.

In certain aspects, the system S is a portable mobile factory which continuously manufactures pipe and, in certain aspects, inserts pipe, e.g., composite stand-alone liners (or "core pipe") made with the factory at the site into damaged underground pipelines. In one embodiment, the construction and installation of a high-pressure liner according to the present invention are done on site nearly simultaneously; e.g. in a temporary manufacturing shelter TMS (see FIG. 7) which protects equipment used in methods according to the present invention as well as personnel during manufacturing and installation.

One end of a host pipe (the pipe to be lined and/or replaced) is exposed, and a long, manufacturing structure, e.g., a tent or portable enclosure (e.g. shelter TMS), is erected to protect material, control systems and workers from the elements. At the terminus of the host pipe is equipment and computer control systems designed primarily to help pull and guide the new pipe through the host pipe. The manufacturing tent, in certain aspects, up to 500 feet long or more, is the site of an assembly line that connects, wraps, and prepares the new pipe for insertion into the host pipe.

According to the present invention, pipe coatings and constructed materials and wrap materials can vary. In one particular aspect of the present invention, a pipeline is manufactured in the following order, working from the inside out: 1. HDPE core pipe, butt fusion welded (using a machine as in FIG. 4), is made; 2. High strength braided fabric sleeve, Wrap 1, is wrapped on the pipe; 3. High Strength braided fabric sleeve, Wrap 2, is wrapped on the pipe; 4. Carbon fiber pulling tapes are applied to the wrapped pipe; 5. Fiber optic sensors are secured to the pipe (Step 5 optional); 6. High Strength fiber tow, Wrap 3, is wrapped on the pipe (Step 6 optional); 7. High Strength fiber tow, Wrap 4, is wrapped on the pipe (Step 7 optional); 8. Pipe deformed for fit in host pipe; 9. Mylar tape wrapped on the pipe to maintain deformation during insertion; 10. HDPE film protective outer wrap wrapped on pipe. In another particular aspect of the present invention, a pipeline is manufactured in the following order, working from the inside out: 1. Begin with core pipe; 2. High strength fabric sleeve, Wrap 1, is constructed on the pipe; 3. High Strength fabric tapes, Wrap 2, is constructed on the pipe; 4. Optional high strength pulling tapes are applied to the constructed pipe; 5. Fiber optic sensors are secured to the pipe (Step 5 optional); 6. High Strength fiber structural windings, Wrap 3, are constructed on the pipe (Step 6 optional); 7. Structural winders, Wrap 4, are constructed on the pipe (Step 7 optional); 8. Outer cover protection is constructed on the pipe.

Systems according to the present, e.g., as in FIG. 4 or FIG. 7, can be used to make a core pipe which is suitable for insertion into a host pipe, the core pipe including: a pipe made of temperature-resistant corrosion-resistant material, the pipe having an outer surface, an inner surface, a first end and a second end and a flow channel therethrough from the first end to the second end, a first strengthening wrap around the pipe, a second strengthening wrap around the pipe, a plurality of spaced-apart pulling tapes positioned longitudinally on the pipe, the pipe deformable to facilitate insertion into a host pipe, and a protective outer wrap on the pipe for protection during insertion into the host pipe, the core pipe made inside a protective structure and, in one aspect, the protective structure is 500 feet long.

Systems according to the present invention, e.g., as in FIG. 4 or FIG. 7, may be used to make a core pipe which is suitable for insertion into a host pipe, the core pipe including a pipe made of temperature-resistant corrosion-resistant material, the pipe having an outer surface, an inner surface, a first end and a second end and a flow channel therethrough from the first end to the second end, a first strengthening wrap around the pipe, a second strengthening wrap around the pipe, a plurality of spaced-apart pulling tapes positioned longitudinally on the pipe, the pipe deformable to facilitate insertion into a host pipe, and a protective outer wrap on the pipe for protection during insertion into the host pipe, a plurality of fiber optic sensors on the pipe, wherein the sensors provide signals indicative of one of tension applied to the pipe, leaks of the pipe, movement of the pipe, and temperature along the pipe, a third wrap to secure the pulling tapes and sensors in place, a fourth wrap to secure the pulling tapes and sensors in place, wherein the pipe is deformable into a "C" shape, wherein the core pipe ranges in length up to 10 miles, and wherein the core pipe is made inside a protective structure.

Systems according to the present invention may be used in a method for making a core pipe suitable for insertion into a host pipe, the method including: welding together a plurality of pieces to form a pipe, a pipe made of temperature-resistant corrosion-resistant material, the pipe having an outer surface, an inner surface, a first end and a second end and a flow channel therethrough from the first end to the second end, wrapping the pipe with a first strengthening wrap, wrapping the pipe with a second strengthening wrap, securing a plurality of pulling tapes on the pipe, deforming the pipe to facilitate insertion thereof into a host pipe, wrapping the pipe following deforming with a plurality of tapes to maintain the pipe in a deformed shape during insertion into a host pipe, and wrapping the pipe with a protective outer wrap to protect the pipe during installation in a host pipe. Such core pipe can, in certain embodiments, range in length up to 10 miles, 100 miles, 750 miles, 1000 miles, or more.

Figure 8:
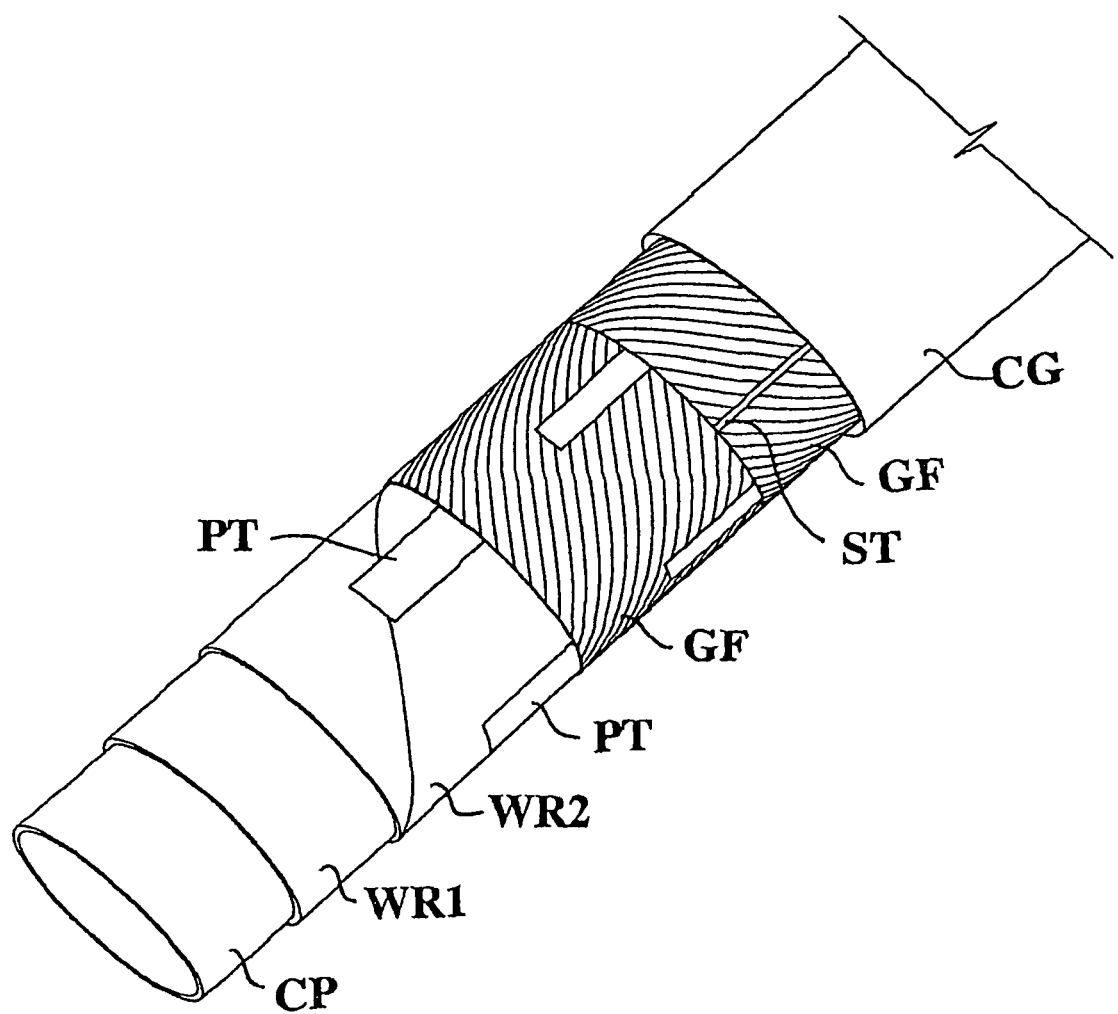
FIG. 8 is a perspective schematic view of a pipe made with a system and method according to the present invention.

Systems and methods according to the present invention can make a pipe as shown in FIG. 8 which is a pipe described in co-owned pending U.S. patent application Ser. No. 12/455,582 filed Jun. 3, 2009 and Ser. No. 12/317,376 filed Dec. 22, 2008—both incorporated here fully for all purposes. A core pipe CP has a layer WR1 over which is a layer WR2 (e.g., as described in the two applications listed above). Pulling tapes PT run the length of the pipe. Optionally a layer (or layers) GF provide support. Optionally sensors ST are applied and the pipe is insertable into a host pipe CG.

In one aspect, a pipe made with systems and methods according to the present invention has a core pipe made of temperature-resistant corrosion-resistant material, at least one strengthening wrap around the pipe, a plurality of spaced-apart pulling tapes positioned longitudinally on the pipe, a protective outer cover on the pipe, and the pipe can be used as a stand-alone pipe, optionally with one or more sensors on the pipe (e.g., fiber optic sensor devices).

As can be easily understood from the foregoing, the basic concepts of the present invention may be embodied in a variety of ways. In one aspect, the basic concepts are embodied in a system with structures and assemblies with movability and portability. It involves both structures, method steps, and techniques as well as devices to accomplish the appropriate ends. Techniques and method steps according to the present invention are disclosed as part of the results shown to be achieved by the various devices and structures and described and as steps which are inherent to utilization and are simply the natural result of utilizing the devices and structures as intended and described. In addition, while some devices and structures are disclosed, it should be understood that these not only accomplish certain methods but also can be varied in a number of ways. Importantly, as to all of the foregoing, all of these facets should be understood to be encompassed by this disclosure.

The discussion herein is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented or apparatus-oriented terminology, each element of the device or apparatus implicitly performs a function. Apparatus claims may not only be included for the device or apparatus described, but also method or process claims may be included to address the functions the invention and each element performs. In certain aspects, embodiments of the present invention allow for different transportable factory configurations for a variety of product designs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application.

It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support". Such changes and alternative terms are to be understood to be explicitly included in the description.

Any acts of law, statutes, regulations, or rules mentioned in this application for patent; or patents, publications, or other references mentioned in this application for patent are hereby incorporated fully and for all purposes by reference. In addition, as to each term used it should be understood that unless its utilization in this application is inconsistent with such interpretation, common dictionary definitions should be understood as incorporated for each term and all definitions, alternative terms, and synonyms are hereby incorporated by reference.

Thus, the applicants for this patent should be understood to have support to claim and make a statement of invention to at least: i) each of the pump systems and new parts thereof as herein disclosed and described, ii) the related methods disclosed and described, iii) similar, equivalent, and even implicit variations of each of these systems, parts, and methods, iv) those alternative designs which accomplish each of the functions shown as are disclosed and described, v) those alternative designs and methods which accomplish each of the functions shown as are implicit to accomplish that which is disclosed and described, vi) each aspect, feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the inventors may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept.

In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually waived or relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Any claims set forth at any time during the pendency of the application for this patent or offspring of it are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

In conclusion, therefore, it is seen that the present invention and the embodiments disclosed herein and those covered by the appended claims are well adapted to carry out the objectives and obtain the ends set forth.

Certain changes can be made in the subject matter without departing from the spirit and the scope of this invention. It is realized that changes are possible within the scope of this invention and it is further intended that each element or step recited herein is to be understood as referring to the step literally and/or to all equivalent elements or steps. It is intended to cover the invention as broadly as legally possible in whatever form it may be utilized. The invention described herein is new and novel in accordance with 35 U.S.C. §102 and satisfies the conditions for patentability in §102. The invention described herein is not obvious in accordance with 35 U.S.C. §103 and satisfies the conditions for patentability in §103.

The inventor may rely on the Doctrine of Equivalents to determine and assess the scope of the invention. All patents and applications identified herein are incorporated fully herein for all purposes. The word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. A system for making pipe, the system comprising
a plurality of apparatuses for making a nonmetallic reinforced pipe, the pipe made by the system comprising a base pipe with at least one additional component applied thereto, the base pipe having a first end, a second end, and an unobstructed flow channel therethrough,
each apparatus of the plurality of apparatuses connected to another of the apparatuses or between two apparatuses,
each apparatus connected with a connector that permits relative motion between connected apparatuses, and
the system comprising a movable system, and
the plurality of apparatuses comprising handling apparatus and application apparatus,
the handling apparatus for receiving the base pipe, and
the application apparatus for applying the at least one additional component onto the base pipe, the base pipe's flow channel unobstructed during said application.

2. The system of claim 1 wherein the system is mobile and further comprises
a prime mover,
a first apparatus connected to the prime mover and to another of the apparatuses, and
the first apparatus connected to the prime mover with a connector that permits relative motion of the first apparatus with respect to the prime mover.

3. The system of claim 1 wherein each apparatus is articulable with respect to each apparatus connected thereto to facilitate movement of the system over varying surfaces.

4. The system of claim 1 wherein the system is transportable at a site that is a site of use of the pipe that is made by the system.

5. The system of claim 1 wherein the pipe is reinforced thermoplastic composite pipe.

6. The system of claim 5 wherein the pipe includes
the base pipe comprising a core pipe made of temperature-resistant corrosion-resistant material,
at least one strengthening wrap around the pipe,
a plurality of spaced-apart pulling tapes positioned longitudinally on the pipe,
at least one sensor on the pipe,
a protective outer cover on the pipe,
the pipe comprising a stand-alone pipe,
the at least one strengthening wrap, the plurality of spaced-apart pulling tapes, the at least one sensor, and the protective outer cover comprising additional components,
the system comprising application apparatuses for applying the additional components to the base pipe with the base pipe's flow channel unobstructed during said applications.

7. The system of claim 6 further comprising
the plurality of apparatuses including
an apparatus for positioning the pipe,
an apparatus for applying the at least one strengthening layer on the pipe,
an apparatus for applying the spaced-apart pulling tapes on the pipe,
an apparatus for applying the at least one sensor on the pipe, and
an apparatus for applying the protective outer cover on the pipe.

8. The system of claim 7 further comprising
a control system for controlling the plurality of apparatuses.

9. The system of claim 1 further comprising
a plurality of enclosures for protecting the apparatuses, personnel, and a control system.

10. The system of claim 1 wherein the system is movable as the system produces the pipe, the system leaving pipe made by the system behind as the system moves on producing pipe.

11. The system of claim 1 further comprising
apparatus for applying to the pipe a barrier to inhibit fluid permeation with respect to the pipe.

12. The system of claim 1 wherein the pipe comprises a stand-alone pipe for lining an existing pipe.

13. A system for making a pipe, the system comprising
apparatus for removing an existing pipe from a trench,
apparatus for introducing a pipe made by the system back into the trench, the pipe made by the system including the existing pipe,
apparatus for applying at least one additional component to the existing pipe following removal of the existing pipe from the trench,
each apparatus connected to another of the apparatuses or between two apparatuses,
each apparatus connected with a connector that permits relative motion between connected apparatuses, and
the system comprising a movable system,
a prime mover,
an apparatus connected to the prime mover and to another of the apparatuses, and
the apparatus connected to the prime mover connected with a connector that permits relative motion of said apparatus with respect to the prime mover.

14. The system of claim 13 wherein the at least one additional component comprises one of tape, wrap, treatment material, cover and instrumentation.

15. The system of claim 13 further comprising
an apparatus for positioning the pipe,
an apparatus for applying the at least one strengthening layer on the pipe,
an apparatus for applying the spaced-apart pulling tapes on the pipe,
an apparatus for applying the at least one sensor on the pipe, an apparatus for applying the protective outer cover on the pipe.

16. The system of claim 13 comprising a plurality of trailers and wherein each apparatus is on a movable trailer.

17. The system of claim 16 wherein the trailers are connected and articulable with respect to each other.

18. The system of claim 13 further comprising movement apparatus for moving the pipe through the other apparatuses.

19. The system of claim 13 further comprising a prime mover for moving the apparatuses.

* * * * *